US012017422B2

(12) United States Patent
Kismarton (10) Patent No.: US 12,017,422 B2
(45) Date of Patent: Jun. 25, 2024

(54) FORMING A CURVED, ELONGATE FIBER-COMPOSITE ARTICLE

(71) Applicant: The Boeing Company, Chicago, IL (US)

(72) Inventor: Max Urban Kismarton, Renton, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/656,619

(22) Filed: Mar. 25, 2022

(65) Prior Publication Data

US 2023/0302745 A1   Sep. 28, 2023

(51) Int. Cl.
*B29C 70/54* (2006.01)
*B29C 70/44* (2006.01)
*B29K 105/08* (2006.01)
*B29L 31/30* (2006.01)

(52) U.S. Cl.
CPC ............ *B29C 70/541* (2013.01); *B29C 70/44* (2013.01); *B29C 70/549* (2021.05); *B29K 2105/0872* (2013.01); *B29L 2031/3085* (2013.01)

(58) Field of Classification Search
CPC .......... B64F 5/10; B29C 70/541; B29C 70/44
See application file for complete search history.

(56) References Cited

U.S. PATENT DOCUMENTS

| 9,254,619 | B2 * | 2/2016 | Rotter | B29C 70/462 |
| 2017/0008217 | A1 * | 1/2017 | Chapman | B29C 53/84 |
| 2019/0329509 | A1 * | 10/2019 | Coxon | B29C 70/462 |

FOREIGN PATENT DOCUMENTS

| EP | 1481790 A2 * | 12/2004 | B29C 70/345 |
| EP | 2561979 A3 | 7/2017 | |
| EP | 3808551 A1 | 4/2021 | |

OTHER PUBLICATIONS

European Patent Office, Extended European Search Report Issued in Application No. 22212954.6, Jul. 28, 2023, Germany, 5 pages.

\* cited by examiner

*Primary Examiner* — Philip C Tucker
*Assistant Examiner* — Hana C Page
(74) *Attorney, Agent, or Firm* — Alleman Hall & Tuttle LLP (57) ABSTRACT

An article-forming tool comprises an elongate jig having a predefined shape, an elongate flexible vise configured to hold a fiber-composite article of a predefined cross section, and a spacer system. The vise opposes the jig; it includes a series of clamp segments and a flexible spline sheet configured to conform controllably to the shape of the jig. The clamp segments are arranged side-by-side along a length of the vise, each clamp segment comprising a set of platens configured to hold a corresponding longitudinal segment of the article. The flexible spline sheet extends through the series of clamp segments, between opposing platens. The spacer system is configured to control the conformation of the spline to the shape of the jig.

23 Claims, 11 Drawing Sheets

FORMING A CURVED, ELONGATE FIBER-COMPOSITE ARTICLE

TECHNICAL FIELD

This disclosure relates generally to the field of fiber-composite article manufacture and more specifically to the manufacture of aircraft having fiber-composite airframe components.

BACKGROUND

Aircraft can be made using lightweight materials in order to optimize performance and fuel economy. For some aircraft, such lightweight materials include fiber-composite materials, in which strong, lightweight fibers are immobilized in a cured resin matrix. Carbon fibers are especially suitable for fiber-composite airframe components. The technology for manufacture of fiber-composite airframe components is relatively new. Accordingly, there remain significant opportunities for improvement of the manufactured components—in terms of strength, weight, cost, etc.—and for improvement in the efficiency of manufacture.

SUMMARY

One aspect of this disclosure relates to an article-forming tool comprising an elongate jig having a predefined shape, an elongate flexible vise configured to hold a fiber-composite article of a predefined cross section, and a spacer system. Opposing the jig, the vise includes a series of clamp segments and a flexible spline sheet configured to conform controllably to the shape of the jig. The clamp segments are arranged side-by-side along the length of the vise, each clamp segment comprising a set of platens configured to hold a corresponding longitudinal segment of the article. The flexible spline sheet extends through the series of clamp segments, between opposing platens. The spacer system is configured to control the conformation of the spline to the shape of the jig.

Another aspect of this disclosure relates to a method for forming an elongate fiber-composite article. The method comprises: (a) warming an elongate, laminated, fiber-composite charge to a sub-curing temperature that facilitates interlaminar sliding within the charge; (b) processing the charge to form an intermediately formed article of a predefined cross section; (c) securing the intermediately formed article in a tool comprising an elongate jig having a predefined shape, an elongate flexible vise configured to hold a fiber-composite article of a predefined cross section, and a spacer system; and (d) actuating the spacer system to cause the spline to conform to the shape of the jig, thereby imparting the shape to the formed article.

This Summary is not intended to identify key features or essential features of the claimed subject matter, nor is the scope of the claimed subject matter limited to implementations that address any problems or disadvantages noted in any part of this disclosure. The features, functions, and advantages described herein may be achieved independently in some implementations but may be combined in other implementations.

BRIEF DESCRIPTION OF THE DRAWINGS

This disclosure will be better understood from reading the following Detailed Description with reference to the attached drawing figures, wherein:

FIGS. 7A through 10 show additional aspects of example article-forming tools.

DETAILED DESCRIPTION

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

An airframe of an aircraft may include numerous fiber-composite stiffener members, such as wing stringers, bonded to the aircraft skin. Every wing stringer follows the inner mold line (IML) of the aircraft wing, which may have a varying shape. On a large commercial aircraft, some wing stringers may be thirty meters or greater in length; the cost of manufacture of a very long fiber-composite article with a precisely defined shape may be very high. Manufacturing cost can be especially high for articles formed from many individual sheets of resin-impregnated carbon-fiber textile ('prepreg' herein), which resist interlaminar sliding at ambient temperatures. Nevertheless, prepreg is a reliable starting material and the basis of a mature fabrication technology. Accordingly, there is value in developing more cost-effective processes for airframe manufacture based on prepreg.

In view of the issues above, this disclosure describes article-forming tools and associated methods for forming elongate, fiber-composite articles such as wing stringers. As noted above, one article-forming tool includes an elongate jig having a predefined shape, an elongate flexible vise arranged over the jig, and a spacer system. An intermediately formed fiber-composite article having a predefined cross section is held by a series of clamp segments in the vise against a flexible spline sheet. The article is supported in its initial shape until the spacer system is actuated. That action causes the spline to conform to the shape of the underlying jig, imparting such shape to the formed article. In examples in which the article is a wing stringer, the shape of the jig may correspond to that of the wing skin to which the stringer is subsequently bonded.

Figure 1:
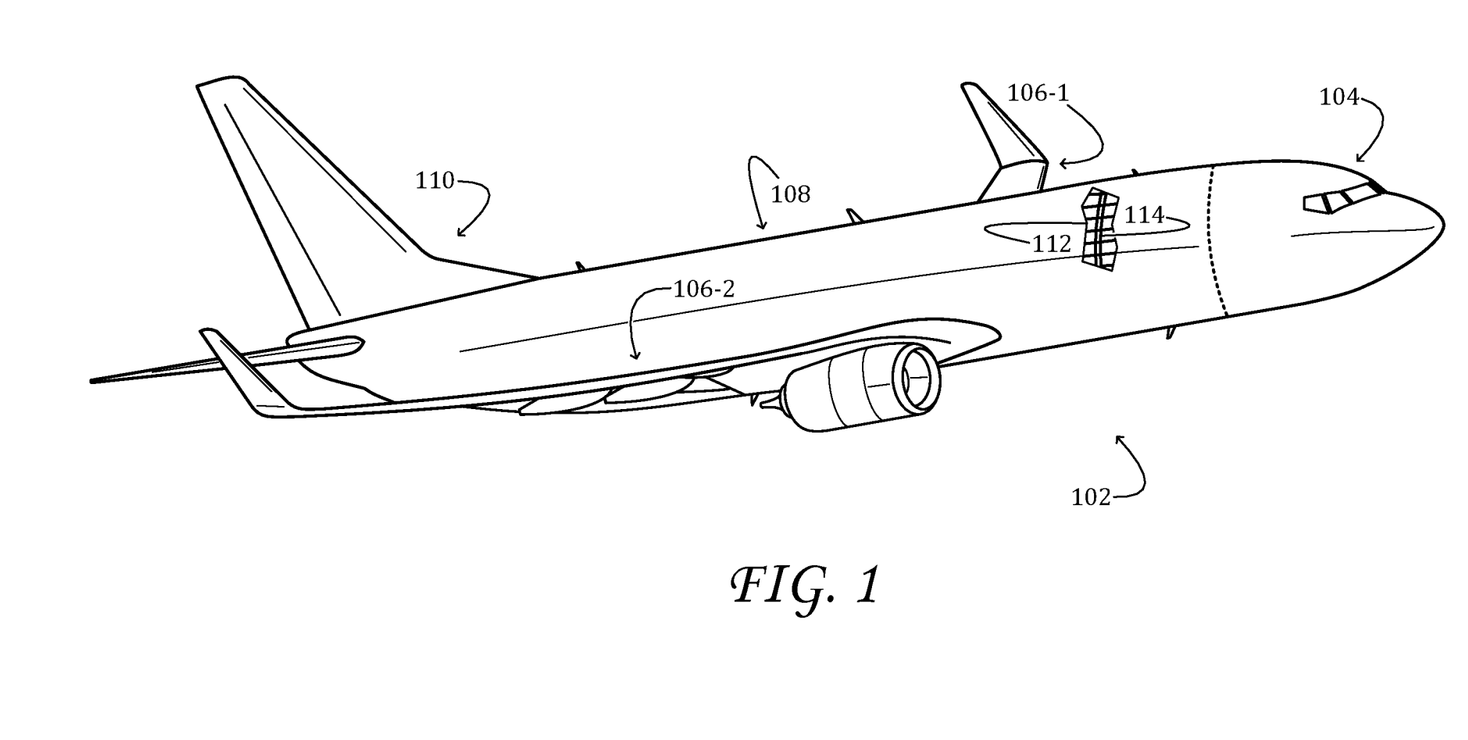
FIG. 1 shows aspects of an example aircraft.

Turning now to the drawings, FIG. 1 shows aspects of an example aircraft 102. The aircraft includes, inter alia, a nose section 104, wing sections 106-1 and 106-2, a fuselage section 108, and a tail section 110. Any or all of these aircraft sections may include a lightweight skin 112. Any or all of these aircraft sections may include a stiffener member 114, such as a stringer, spar, rib, and/or longeron. A stiffener member may be arranged beneath the skin, to increase the rigidity of the skin. In some examples, a stiffener member may comprise fiber-composite material. In some examples, the aircraft skin may comprise fiber-composite material. In other examples, the aircraft skin may comprise a lightweight metal, such as aluminum.

The compositions of the fiber-composite materials herein are not particularly limited. Example fiber-composite materials include textiles in which carbon fibers are immobilized in a polymer. The polymer may be thermosetting in some examples and thermoplastic in other examples. Example thermosetting polymer resins may include one or more of an epoxy-amine resin, a urethane resin, or an acrylamide resin. Such resins may be curable in air. Example thermoplastic polymers include polyetherether ketone (PEEK) and polyetherketone ketone (PEKK), among others.

Figure 2:
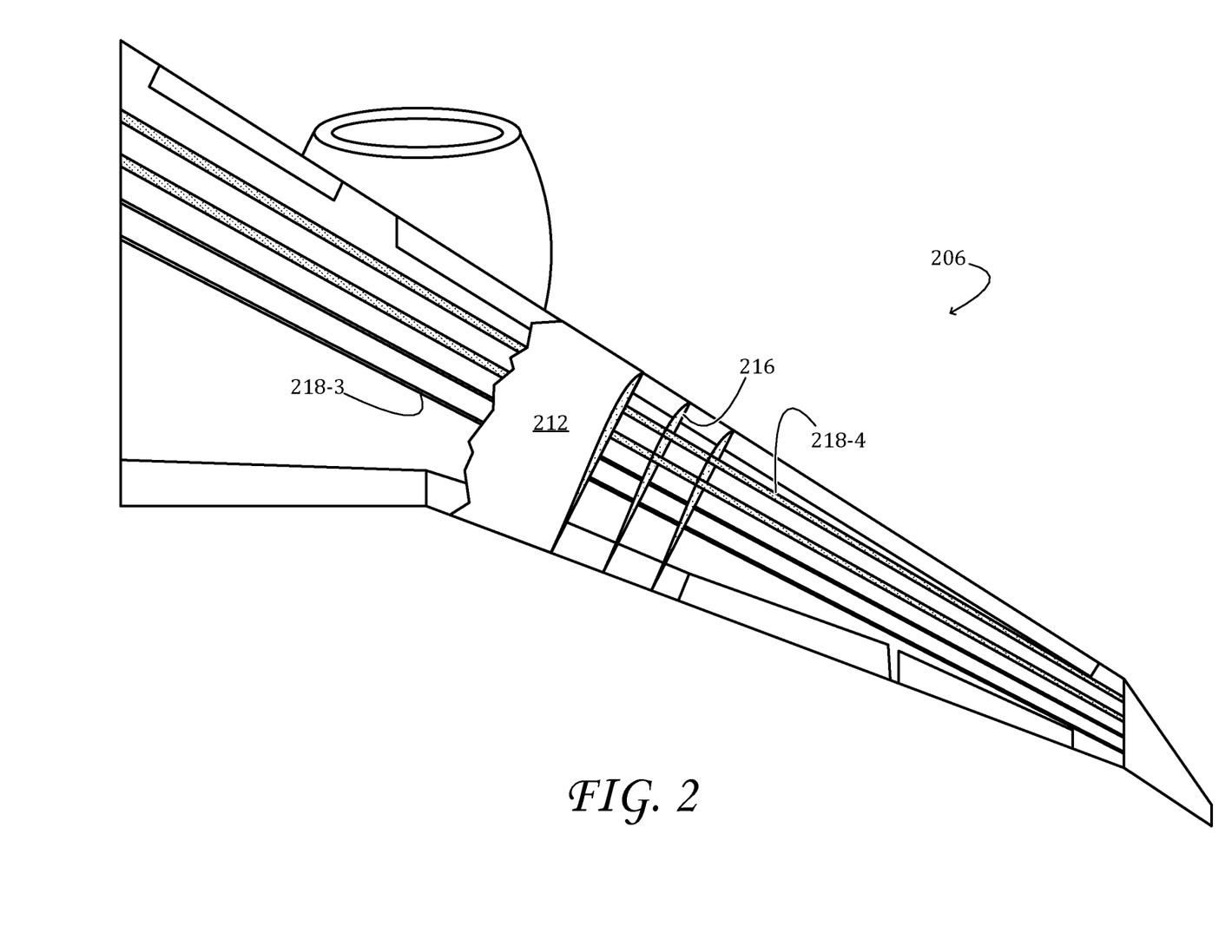
FIG. 2 shows aspects of an example wing section of an aircraft.

FIG. 2 shows aspects of an example wing section 206 of an aircraft. Wing skin 212 follows the profile defined by ribs 216, and stringers 218 run the length of the wing, providing support for the ribs. It will be understood that the configuration shown in FIG. 2 is simplified for clarity; an actual aircraft wing section may include many more ribs and stringers. The aircraft shown in FIGS. 1 and 2 has a wingspan of 35.9 meters and a length of 35.6 meters from nose to tail. Accordingly, certain components of the aircraft, including the wing stringers, may be commensurately long. A wing stringer may be over thirty meters in length in some examples. An advantage of the tools and methods here disclosed is that they can be used to form wing stringers and other stiffener members of any length.

Figures 3A, 3B, 3C:
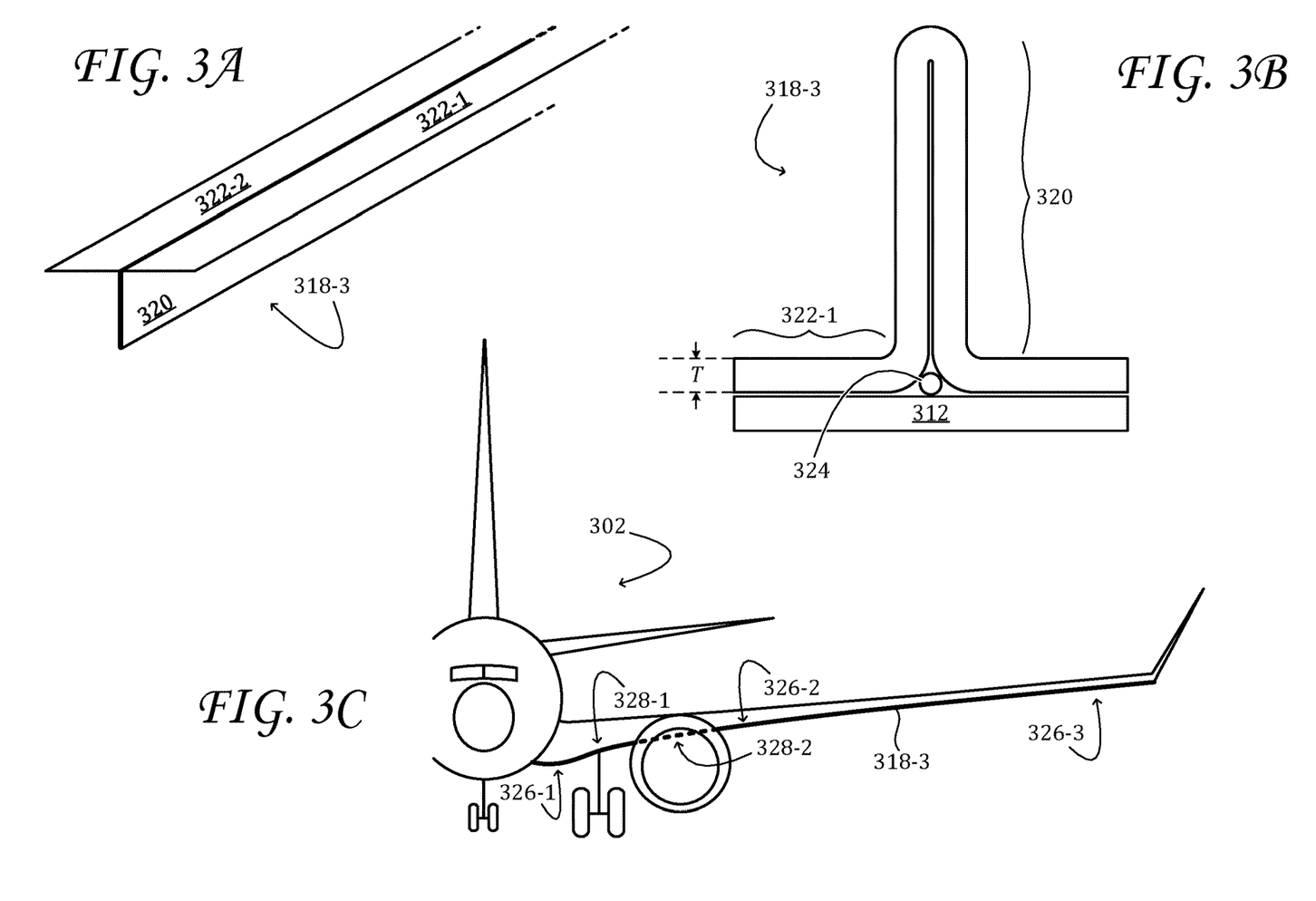
FIGS. 3A through 3C show aspects of an example blade stringer of an aircraft.

FIG. 2 shows two types of wing stringers: blade stringers 218-3 and hat stringers 218-4. FIGS. 3A, 3B, and 3C show additional aspects of an example blade stringer 318-3. Blade stringer 318-3 is a fiber-composite article; it includes blade region 320 and flange regions 322-1 and 322-2. In some examples, the wall thickness T of the blade stringer may be about 8 to 10 millimeters (mm), corresponding to about forty layers of prepreg. In these and other examples, the blade stringer may be about 64 mm in height, and the flange region may be about 100 mm in width. It will be understood that this disclosure is equally applicable to blade stringers of other dimensions and shapes, and to stiffener members other than blade stringers.

As shown in FIG. 3B, blade stringer 318-3 is bonded to skin 312 of an aircraft wing. Flange regions 322 enable bonding between the blade stringer and the skin. The bonding may be primarily via an adhesive, such as a thermosetting adhesive polymer film. Example adhesives include AF555 (a product of 3M of Saint Paul, Minnesota) or Metlbond 1515 (a product of Solvay of Brussels, Belgium). In the case of thermoplastic matrices, the bonding may be a function of the native matrix. Hardware fasteners (e.g., steel or titanium bolts, not shown in the drawings) may also be used in selected locations. For improved resistance to mechanical stresses, blade stringer 318-3 includes radius filler 324—a curled or rolled segment of fiber-composite material arranged where skin 312 meets the folded region of the blade stringer. The terms 'radius filler' and 'noodle' may be used interchangeably. The view of the blade stringer in FIG. 3B is adapted for clarity, showing gaps between the blade layers, the flange, and the skin, and between the radius filler and surrounding components. In the actual assembly there are no gaps in these areas.

FIG. 3C shows blade stringer 318-3 installed in aircraft 302. The blade stringer follows the varying shape of the wing skin of the aircraft. The term 'shape', as applied to the blade stringer, includes any curvature presented by the wing skin or other mating part. The term 'shape' also takes into account any thickness ramp, swell, or bump that the blade stringer must have in order to follow the curvature. In the aerospace industry, the term 'geometry' is also used in this context. In examples in which the mating part is the wing skin, the shape may be that of the inner mold line (IML) of the wing skin. In many cases the curvature presented by the mating part is a 'varying curvature', which admits of two different meanings, both relevant to this disclosure. First, at a given distance from the wing tip, the curvature may vary from one stringer to another. Second, the curvature along a given stringer may vary from one locus to another along the length of the stringer. That aspect is shown in FIG. 3C, where the curvature transitions from an upward concavity at locus 326-1, to a downward concavity and tight (25 to 76-meter) radius at locus 326-2, to a near-infinite radius at locus 326-3.

In addition to the varying curvature, the thickness of a wing stringer may vary from one locus to another. In some examples, a wing stringer may have a substantially constant thickness except in regions 328-1 that support landing gear, and regions 328-2 that support an engine. In those regions, the thickness may 'ramp' up in a gradual, stepwise manner, by about 6 mm. The fabrication methods herein are intended to support ramping thickness as well as varying curvature.

Figure 4A:
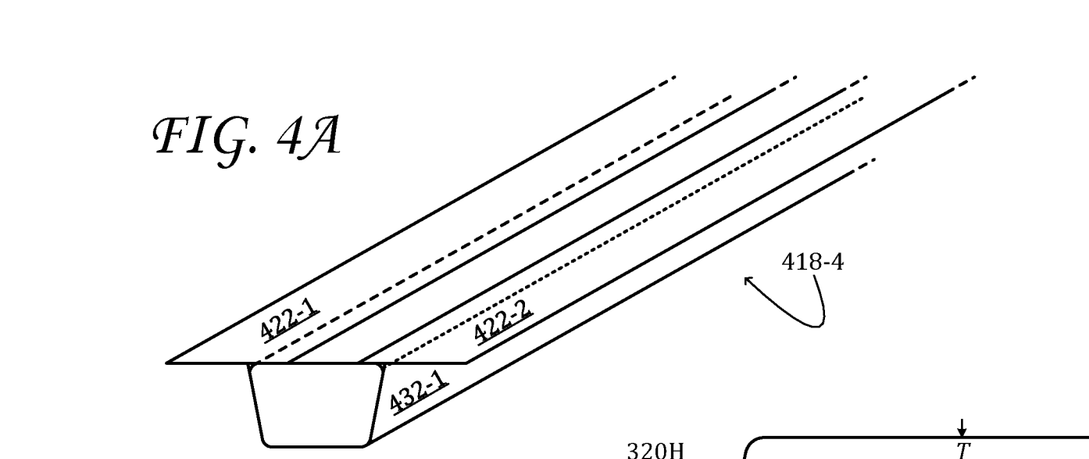
FIGS. 4A and 4B show aspects of an example hat stringer of an aircraft.
Figure 4B:
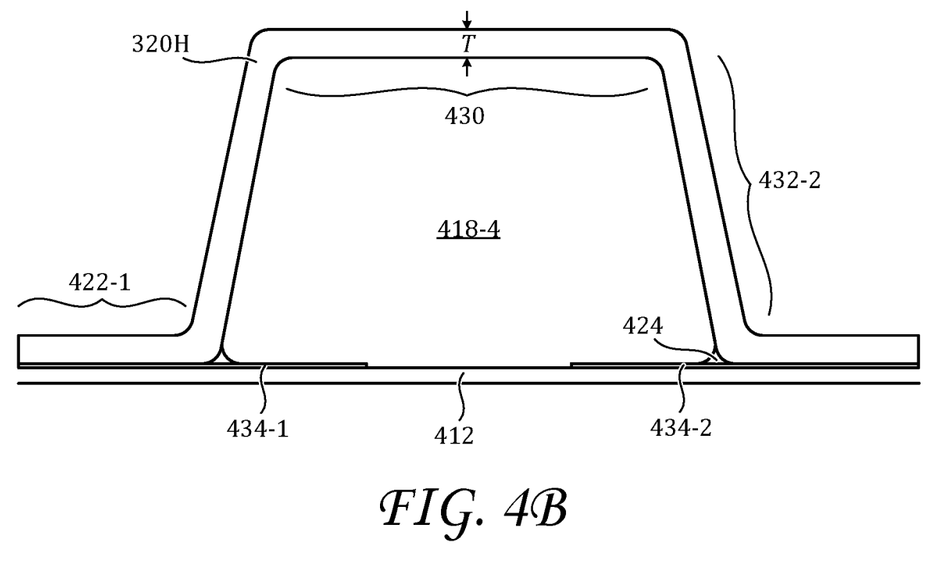

FIGS. 4A and 4B show additional aspects of an example hat stringer 418-4. The hat stringer is a fiber-composite article; it includes cap region 430, web regions 432-1 and 432-2, and flange regions 422-1 and 422-2. In some examples, the wall thickness T of the hat stringer may be about 8 to 10 mm, the web regions may be about 64 mm in height, and the cap region may be about 100 mm in width. It will be understood that this disclosure is equally applicable to hat stringers of other dimensions and shapes, and to stiffener members other than hat stringers.

Like blade stringer 318-3, hat stringer 418-4 is bonded to skin 412 of an aircraft wing; it forms, in combination with the skin, an elongate, hollow conduit suitable to accommodate cables, compressed-gas lines, and/or vacuum lines, for example. Flange regions 422 enable bonding between the hat stringer and the wing skin. For improved resistance to mechanical stresses, the hat stringer includes radius filler 424 arranged where skin 412 meets hat stringer 418-4 at an acute angle. Flange extensions 434 support the radius filler and provide an extended area of adhesive bonding between the hat stringer and the wing skin. In some examples, a flange extension includes at least two plies of a fiber-composite material.

Figures 5A, 5B:
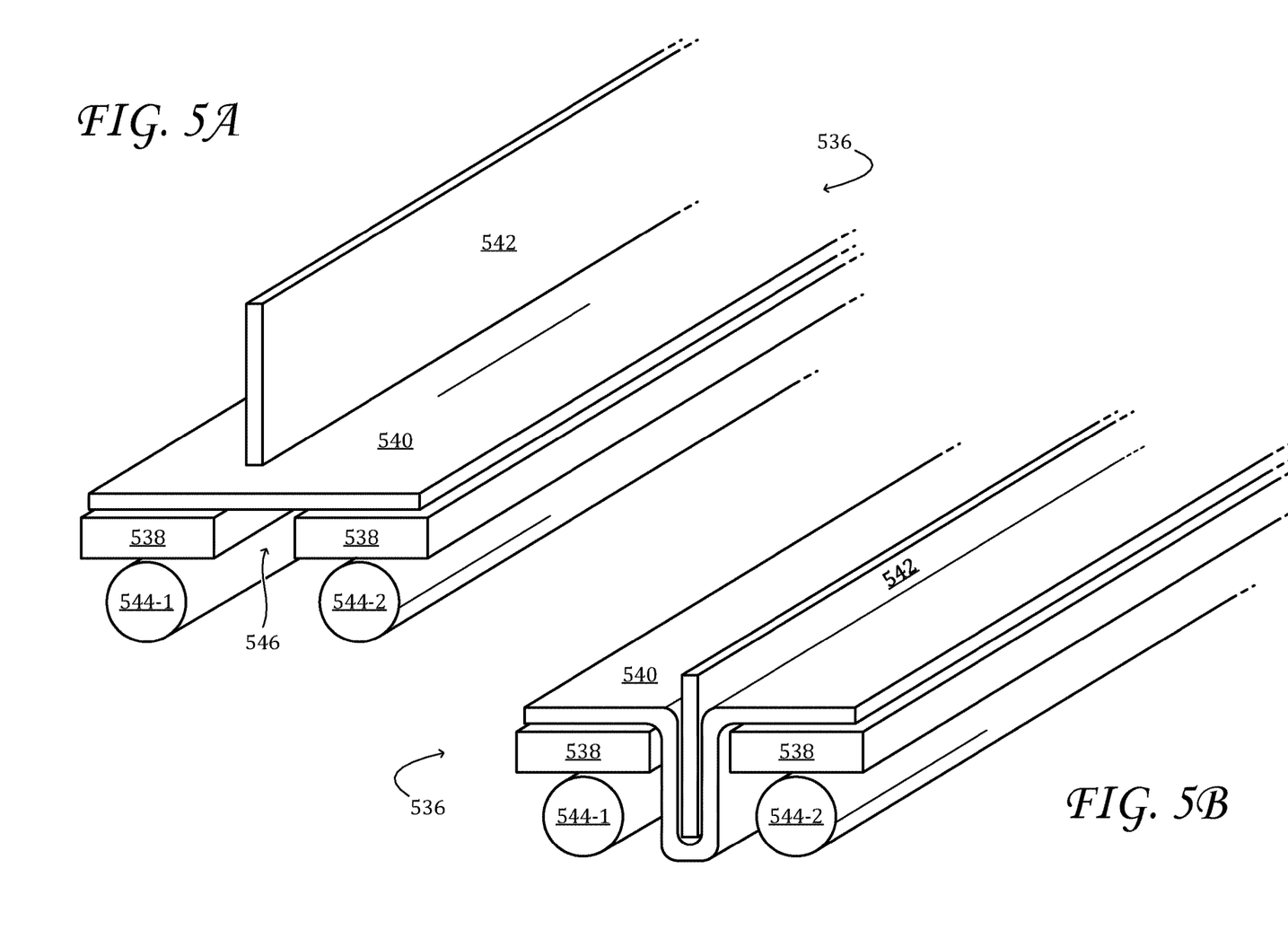
FIGS. 5A through 5D show aspects of an example article-forming tool and an article formed therein.

The methods of manufacture disclosed herein are supported by a series of specialized tools, such as lay-up tools, article-forming tools, and curing ovens, inter alia. FIGS. 5A and 5B show aspects of an example article-forming tool 536. More specifically, article-forming tool 536 is a punch former. Deck 538 of article-forming tool 536 is configured to accommodate a fiber-composite charge 540. In some examples, the charge may take the form of a slab approximately 300 mm wide, which runs the entire length of a wing stringer. The charge may be a laminate comprising multiple layers of prepreg—about forty layers in some examples. The charge may be processed at an elevated temperature that facilitates interlaminar sliding—i.e., in-plane translation of each lamina with respect to the adjacent laminae. The appropriate temperature range for processing may be 60 to 180° C. for a charge comprising a thermosetting resin as described hereinabove. Naturally, temperatures exceeding the thermoset-activation temperature are to be avoided prior to the final curing step, as such temperatures trigger irreversible hardening of the charge. In some examples, heat may be provided via an integrated deck heater and/or a heating blanket (not shown in the drawings), which may be arranged over the charge. In other examples the charge may be heated outside of article-forming tool 536.

Figures 5C, 5D:
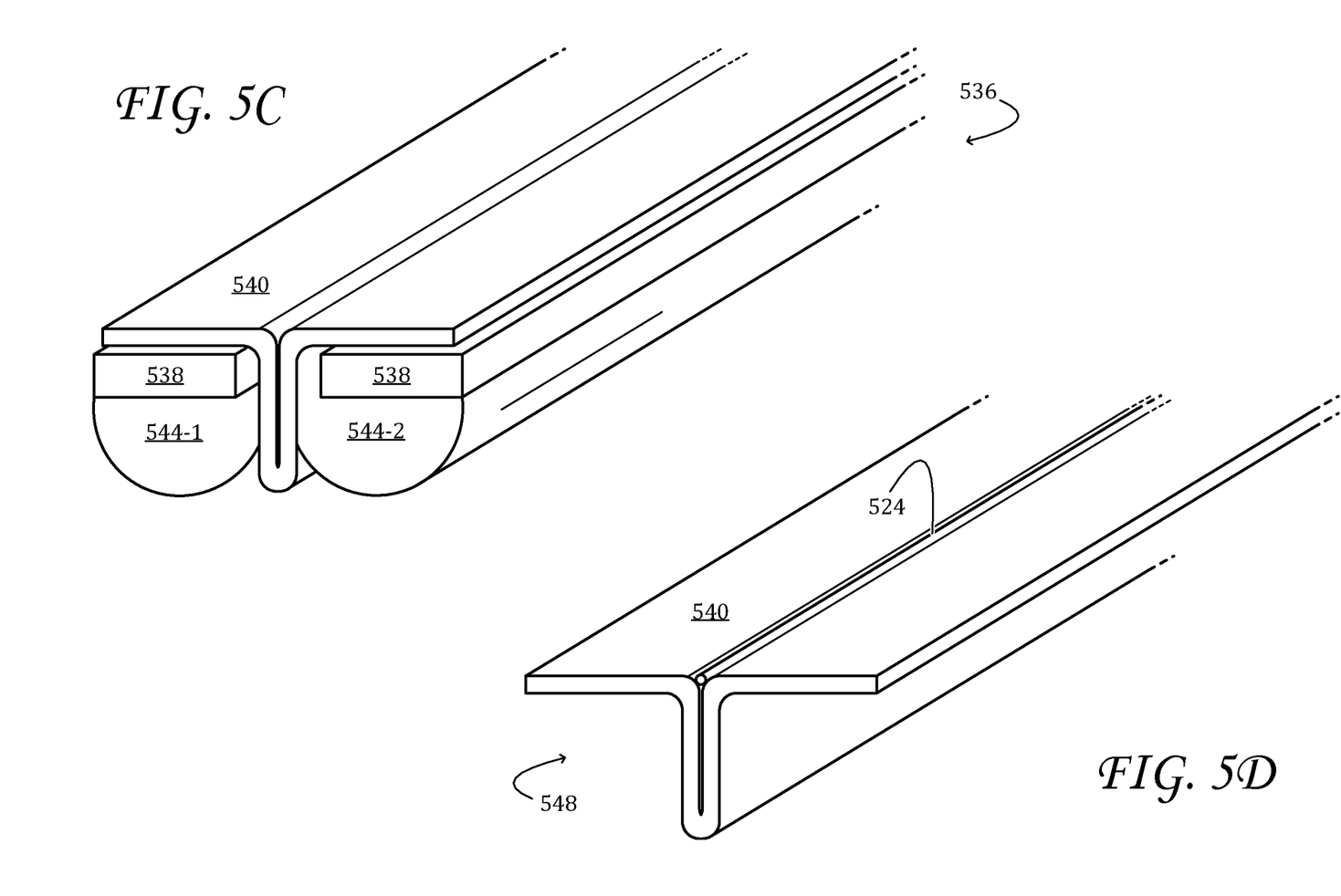

Article-forming tool 536 includes a forming blade 542 and opposing air bladders 544. Deck 538 has a slot 546, which is at least as wide as the forming blade plus twice the thickness of charge 540. Forming blade 542 descends through the slot, thereby pushing the center region of the charge through the slot and causing the center region to fold over onto itself. The forming blade is then retracted and the air bladders are inflated. This action closes the gap between opposing sides of the folded-over center region, thereby creating the tee-shaped cross section of a blade stringer. FIG. SD shows an intermediately formed article 548 formed in this manner. The intermediately formed article includes punch-processed charge 540, to which radius filler 524 is subsequently added.

Some punch formers may include a series of electromechanical actuators, each configured to apply a controllably variable force to a different longitudinal segment of an elongate article. An article-forming tool of this kind may be capable of imparting predefined shape to a wing stringer in addition to a predefined cross section. However, for some wing configurations, many actuators may be needed to impart the predefined shape at the required accuracy, and each actuator may add considerable cost to the tool. An article-forming tool capable of punch-forming a thirty-meter stringer without any article-bending electromechanical actuators may cost three million dollars; one that includes electromechanical actuators in sufficient number to form an appropriately curved wing stringer may cost ten times that amount. Moreover, the total fabrication time for a wing stringer bent to the desired geometry in a punch former may approach 200 hours. For these reasons, among others, it may be desirable to achieve punch-forming and bending operations separately, using less expensive tools that avoid expensive electromechanical bending and lengthy processing.

Figures 6A, 6B:
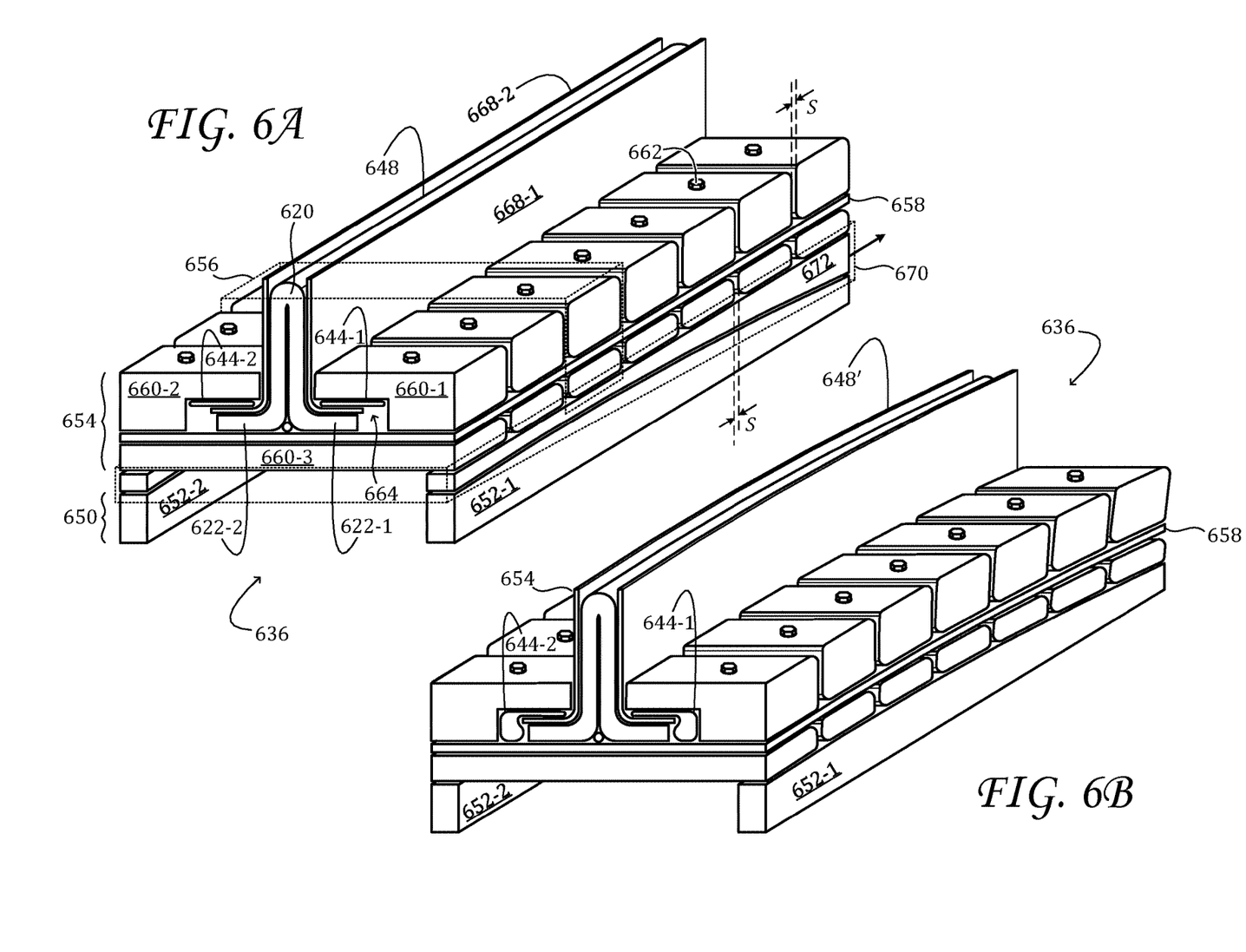
FIGS. 6A and 6B show aspects of another example article-forming tool and an article formed therein.

FIGS. 6A and 6B show aspects of another example article-forming tool 636. In some examples, article 648' formed in article-forming tool 636 may be a stiffener member of an airframe of an aircraft. In more particular examples, the article formed may be a stringer for a wing of an aircraft. Generally speaking, article-forming tool 636 is configured to impart a predefined shape to an intermediately formed fiber-composite article 648 having a predefined cross section, such as an article formed in article-forming tool 536. In the illustrated example, the intermediately formed article has a tee-shaped cross section akin to that of blade stringer 318-3 of FIGS. 3A and 3B. In particular, the intermediately formed article includes a blade region 620 and first and second flange regions 622-1 and 622-2, extending in opposite directions from the blade region.

Article-forming tool 636 includes elongate jig 650 having a predefined shape at the upper surface of the jig. In examples in which the article to be formed is a wing stringer for an aircraft, the shape may be that of the area of the wing skin to which the wing stringer will be affixed. In the illustrated example, jig 650 includes parallel rails 652-1 and 652-2, which define the shape. In examples in which the article to be formed presents substantially no twist, the parallel rails may have the same shape. In examples in which the article is twisted, the shape of rail 652-2 may differ from the shape of rail 652-1. The rails can be formed from any suitable material—e.g., metal, wood, etc.

Elongate, flexible vise 654 opposes jig 650. In the illustrated example, the vise is arranged over the jig and configured to hold an intermediately formed fiber-composite article 648 of a predefined cross section. In some examples, the intermediately formed fiber-composite article may be a fiber-composite charge bent into a predefined cross section, as described above. The charge may be a laminate of multiple layers of a fiber-composite textile, such as prepreg textile.

Vise 654 includes a series of clamp segments 656 and a flexible spline sheet 658 extending through the series of clamp segments. The clamp segments are arranged side-by-side along the length of the vise. The number of clamp segments per unit length of the article may vary from one implementation to the next. For a wing stringer in which the radius of shape varies from infinity to 25 meters, 8 to 13 clamp segments per meter may be used.

Each clamp segment 656 comprises a set of platens 660 configured to hold a corresponding longitudinal segment of article 648. Each clamp segment in the illustrated example includes adjacent first and second (upper) platens 660-1 and 660-2 and a third (lower) platen 660-3 opposing both the first and second platens. In this configuration, vise 654 holds blade region 620 of article 648 between first platen 660-1 and second platen 660-2 of each clamp segment. In addition, the vise holds first flange region 622-1 and second flange region 622-2 between third platen 660-3 and the respective first and second platen of each clamp segment.

Figure 7A:
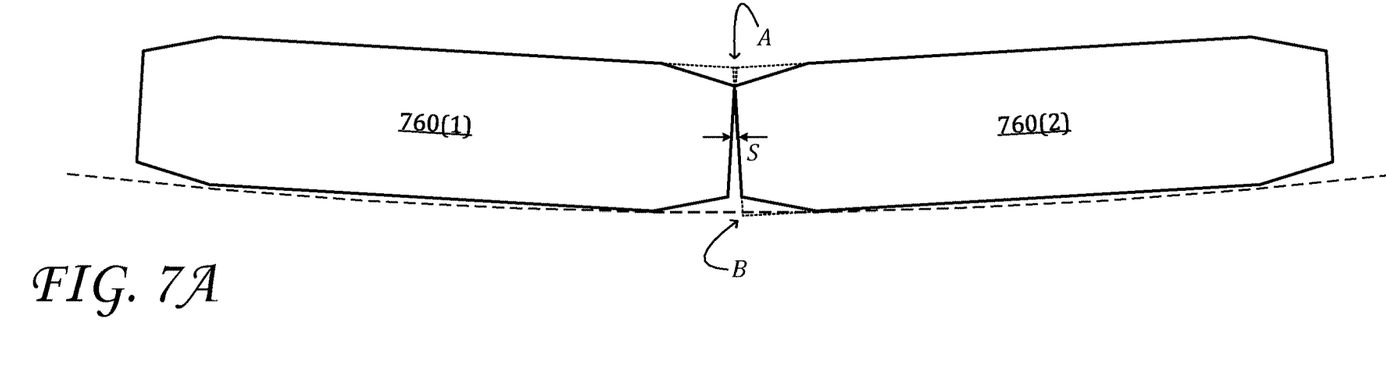
Figure 7B:
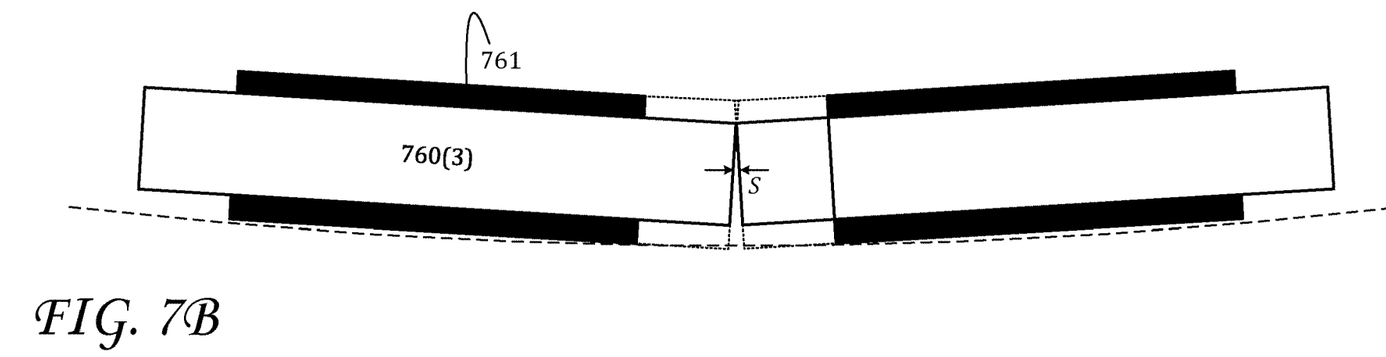

In vise 654 adjacent pairs of first platens 660-1, adjacent pairs of second platens 660-2, and adjacent pairs of third platens 660-3 are separated along the length of the vise by a spacing S. In some examples, S=2 to 3 mm, although other spacings and ranges of spacings are also envisaged. The spacing enables the series of clamp segments to closely follow the shape of the jig. To that same end, each of the platens may take the form of a block with chamfered edges, as illustrated in FIGS. 6A and 6B and further illustrated in FIG. 7A, where adjacent platens 760(1) and 760(2) of a vise 700 follow the radius of curvature shown in the dashed line. Chamfered corners on the concave side of the curvature enable the platens to follow a tighter curvature at a given spacing S than would be possible with right-angle corners, by avoiding contact between platens in region A. Chamfered corners on the convex side of the curvature lessen the extent by which the corners protrude outside of the intended radius of curvature in region B. Alternatively, to achieve the same effects as the chamfering, each platen 760(3) may comprise a block supporting one or more contact pads 761 of engineered dimensions, such contact pads being recessed an appropriate distance from the block edge, as shown in FIG. 7B.

Returning to FIGS. 6A and 6B, in some examples each clamp segment 656 includes a fastener 662 for each first platen 660-1 and second platen 660-2. The fastener is configured to tension the first or second platen against the opposing third platen 660-3, thereby compressing the respective first and second flange regions 622-1 and 622-2. In the illustrated example, each fastener takes the form of a screw that extends through spline sheet 658. In some examples, the fasteners may include quick-release mechanism to facilitate removal of the formed article.

Vise 654 includes a bladder system 664 configured to distribute pressure evenly on first and second flange regions 622-1 and 622-2. In the illustrated example, the bladder system includes elongate first and second air bladders 644-1 and 644-2, which extend through the series of clamp segments 656. First air bladder 644-1 is arranged between first platen 660-1 of each clamp segment and the first flange region 622-1 of article 648; likewise, second air bladder 644-2 is arranged between second platen 660-2 of each clamp segment and the second flange region 622-2 of the article. In some examples, the air bladders may take the form of 50-mm diameter hose.

Vise 654 includes first and second caul plates, 668-1 and 644-2, arranged between the respective first and second air bladders 644-1 and 644-2 and the respective first and second flange regions 622-1 and 622-2. Each caul plate is configured to allow flexion along a first (e.g., longitudinal) axis and to resist flexion along a second (e.g., transverse) axis. In some examples, each caul plate may comprise a fiber-composite material at a thickness of about 2 mm. In some examples, each caul plate may have at least one non-stick surface.

Spline sheet 658 extends between opposing platens 660 over the full length of intermediately formed article 648. The spline sheet may have a substantially planar equilibrium state, such that it holds the intermediately formed article flat when the article is initially secured in article-forming tool 636. However, the spline sheet is configured, under controlled conditions, to deform to the shape of jig 650. In effect, the spline sheet receives discrete stress forces from each of the series of clamp segments 656 but responds with longitudinally continuous strain, thereby imparting a continuous deformation to the article being formed. The spline sheet may comprise any suitably stiff, suitably flexible material. In some examples the spline sheet may comprise a thin (e.g., 2.5 mm) sheet of carbon-fiber composite having the same coefficient of thermal expansion as the article to be formed.

Spacer system 670 is configured to prevent spline sheet 658 from conforming to the shape of jig 650 before the stage of fabrication in which conformation is intended—viz., before the spacer system is actuated. In some examples, the spacer system includes at least one removable or retractable spacer 672 arranged between jig 650 and vise 654. The spacer system is actuated, in these examples, by removal or retraction of the spacer(s). In some examples, removable or retractable spacers prop up the clamp segments of the vise so that they lie substantially within a plane—consistent with the substantial flatness of the intermediately formed article 548 from article-forming tool 536. In the illustrated example, spacer 672 is a retractable spacer that is pulled out gradually from the back of the tool to cause the vise to fall onto the jig. In the illustrated example, one retractable spacer 672 is provided for each rail 652. It will be understood, however, that this disclosure equally embraces any other vise-support configuration capable of transitioning from the conformation of intermediately formed article 648 to that of jig 650.

Figure 8:
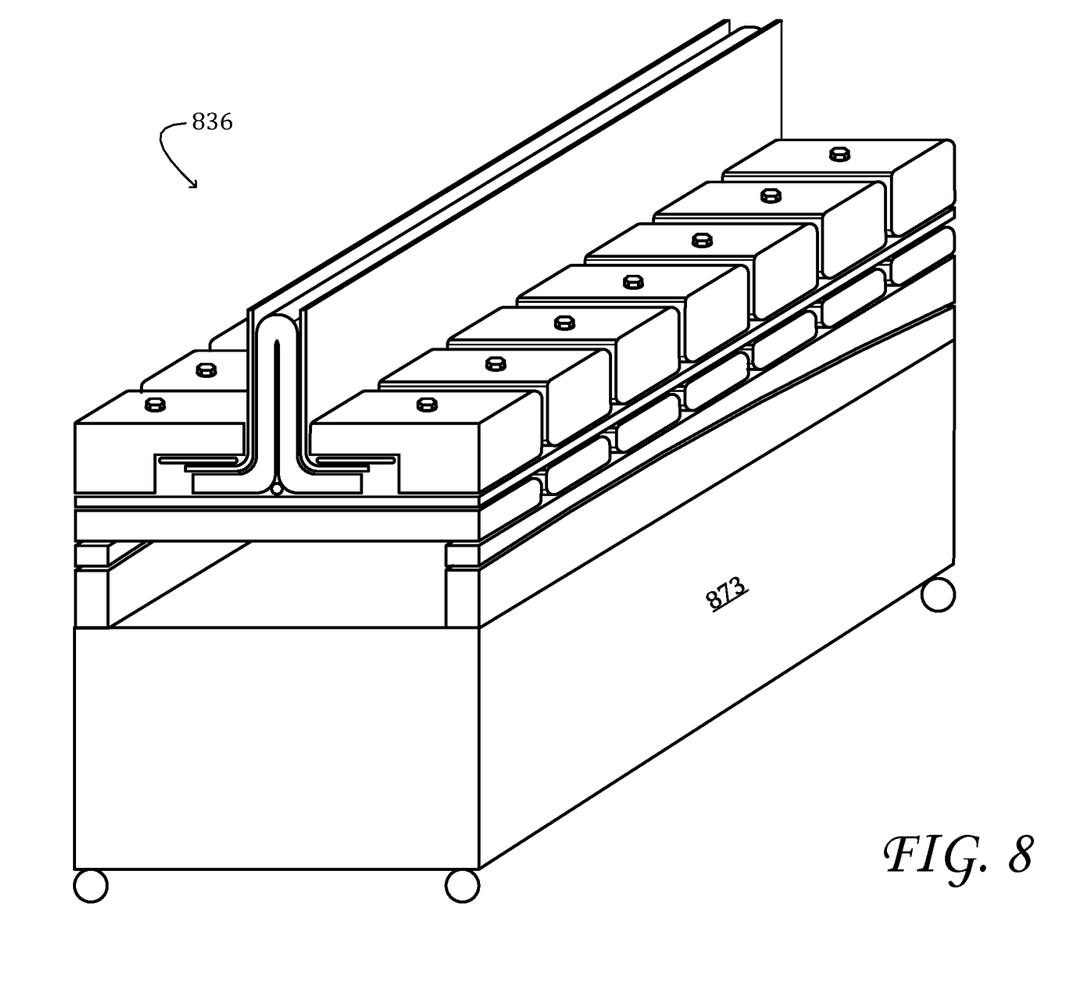

FIG. 8 shows aspects of another example article-forming tool 836. Article-forming tool 836 includes all of the features of article-forming tool 636 and also includes a rolling base 873. The rolling base is configured to allow the tool and the article held therein to be transported before, during, and/or after processing to the location of a different tool and/or storage location.

Figure 9:
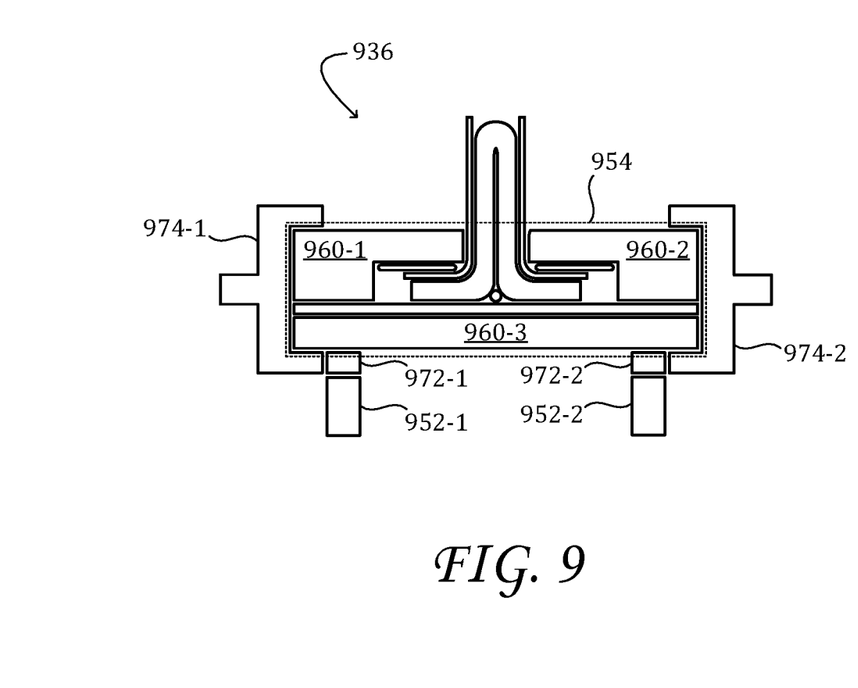
Figure 10:
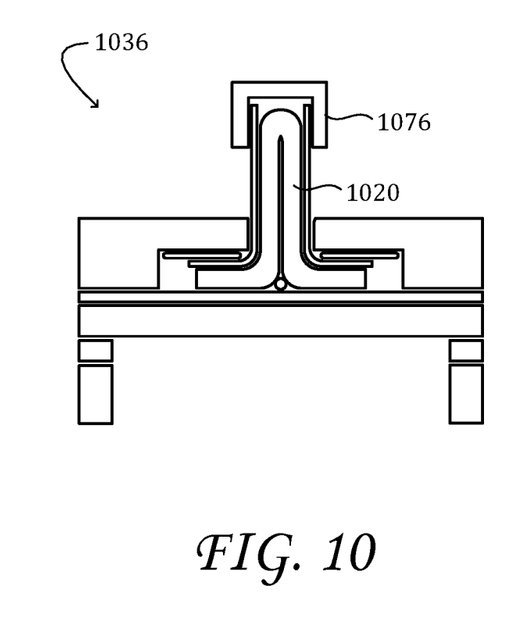

FIGS. 9 and 10 illustrate additional features that may be used in combination with the article-forming tools of FIGS. 6A through 8. Article-forming tool 936 of FIG. 9 includes handlebars 974 that latch onto vise 954 and thereby enable the vise and the article therein to be rotated from the blade-down to the blade-up configuration and vice versa. More particularly, handlebar 974-1 clamps onto the series of first platens 960-1 and onto the series of third platens 960-3; likewise, handlebar 974-2 clamps onto the series of second platens 960-2 and onto the series of third platens 960-3. The rotation feature is useful in processes in which article-forming tool 536 yields the intermediately formed article in a blade-down orientation, in that article-forming tool 636 is configured to receive the intermediately formed article in a blade-up orientation. Handlebars 974 may be removed from the tool before spacers 972 are removed and the vise is allowed to conform onto the jig. In order to provide an area for handlebars 974 to grip onto, spacers 972 and rails 952 may be recessed relative to their position in article-forming tool 636. It will be understood that the illustrated handlebars are only one example of a rotation mechanism suitable for rotation of the intermediately formed article, and that this disclosure is equally consonant with other rotation mechanisms.

Article-forming tool 1036 of FIG. 10 includes a clamp 1076 configured to compress blade region 1020 of the article formed therein. This feature is especially useful on longitudinal segments of the article in which the shape has upward concavity, as curving the intermediately formed article in that sense is liable to cause the blade region to separate along the fold.

Figure 11:
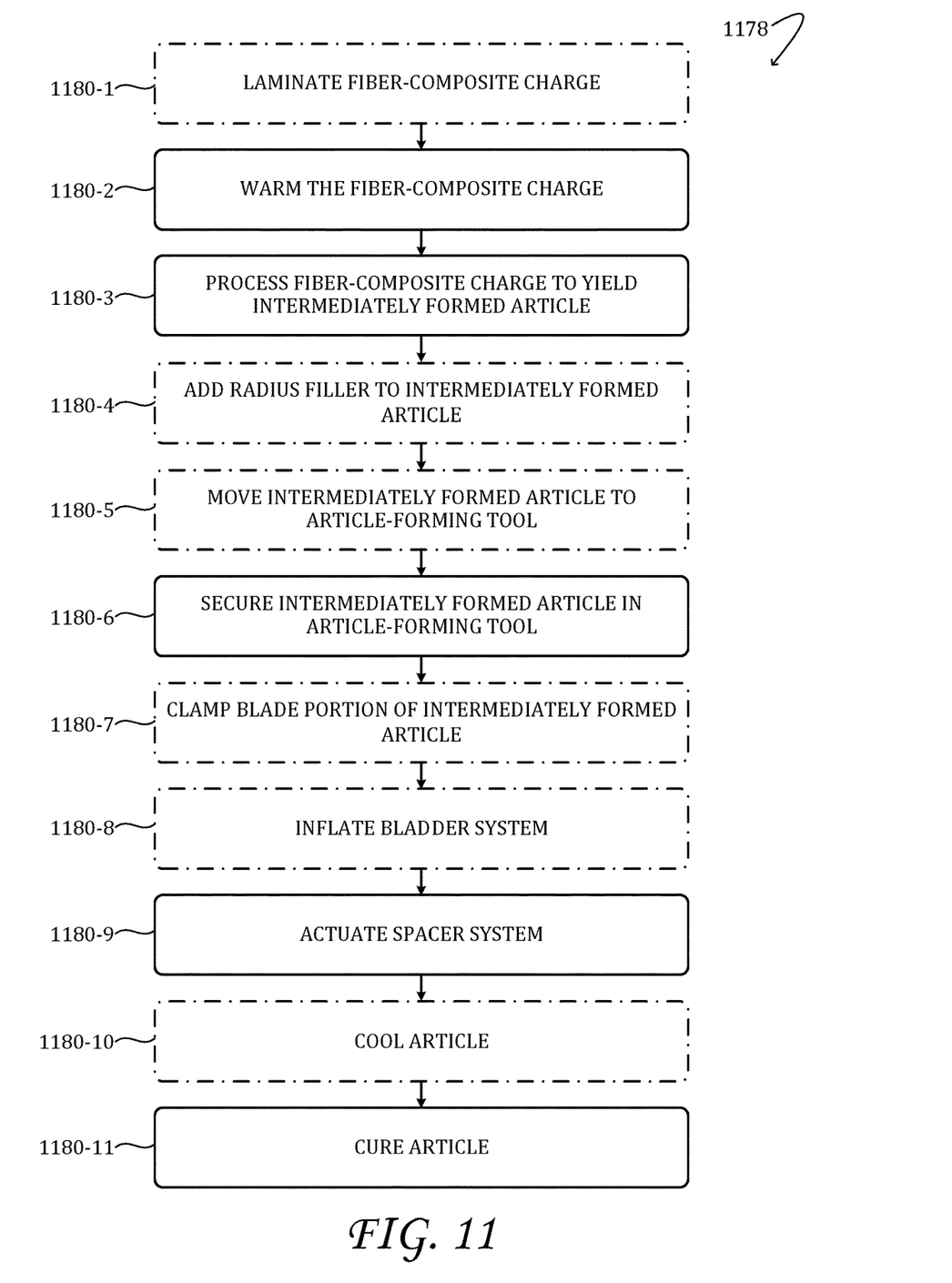
FIG. 11 shows aspects of an example method for forming an elongate fiber-composite article.

FIG. 11 shows aspects of an example method 1178 of forming an elongate fiber-composite article. In some examples, the fiber-composite article is a stiffener member of an airframe of an aircraft, such as a wing stringer. Method 1178 is also applicable to, inter alia, fuselage stringers engineered to not remain straight—e.g., stringers in the nose and/or tail cone, and also within the (horizontal or vertical) tail itself. For ease of understanding, the method is described with continued reference to the configurations of FIGS. 5A through 10. It will be understood, however, that method 1178 may be supported by other configurations as well.

At 1180-1 of method 1178, a plurality of fiber-composite (e.g., prepreg) sheets are laid down individually and laminated together to form a charge. In some examples, the sheets are cut to predetermined dimensions prior to lamination. In some examples the charge may take the form of an elongate slab 2 to 50 m in length, about 200 to 400 mm in width, and about 5 to 20 mm in thickness. In some examples, different numbers of fiber-composite sheets are stacked at different longitudinal positions along the charge, providing a thickness ramp within the charge. At 1180-2 the charge is warmed to a sub-curing temperature that facilitates interlaminar sliding. In some examples, the charge may be warmed to about 60° C. over a period of about 30 minutes.

At 1180-3 the charge is processed to form an intermediately formed article of a predefined cross section. In some examples, the charge is processed after the warming. More particularly, the warming may be discontinued before further processing of the charge. In other examples, warming and processing may be enacted concurrently. In some examples, the charge is punch processed—e.g., using article-forming tool 536 of FIGS. 5A and 5B, or the like. In examples in which the article is a wing stringer of an aircraft, punch processing may take about 10 minutes. At 1180-4 a fiber-composite radius filler is added to the blade region of the intermediately formed article. In method 1178 as illustrated, the radius filler is added prior to moving the intermediately formed article to a different article-forming tool. However, that order of operations may differ in other examples.

At 1180-5 the intermediately formed article is moved from the tool configured to define the cross section of the article to the tool configured to bend the intermediately formed article to the predefined shape. In some examples, the intermediately formed article may be rotated from a blade-down to a blade-up orientation when transferred from one tool to another. At 1180-6 the intermediately formed article is secured in the article-forming tool configured to bend the article to the predefined shape. As noted in the context of FIGS. 6A and 6B, this tool may comprise (a) an elongate jig having a predefined shape, (b) opposing the jig, an elongate flexible vise configured to hold the intermediately formed article, the vise including a series of clamp segments arranged side-by-side along a length of the vise, each clamp segment comprising a set of platens configured to hold a corresponding longitudinal segment of the intermediately formed article, and a flexible spline sheet extending through the series of clamp segments, between opposing platens, and configured to conform controllably to the shape of the jig; and (c) a spacer system configured to control the conformation of the spline to the jig.

At optional step 1180-7, in examples in which the intermediately formed article includes a blade region having a fold and first and second flange regions extending in opposite directions from the blade region, the blade region may be clamped in directions parallel to the flange regions, in order to prevent separation (e.g., delamination) at the fold. To that end, a series of mechanical clamps may be used, as shown in FIG. 8, in selected locations along the article.

In examples in which the vise of the article-forming tool includes a bladder system, the bladder system, at 1180-8, may be inflated. That action may be taken before, during, or after the actuation step indicated at 1180-9 of method 1178. At 1180-9 the spacer system is actuated, causing the spline to conform to the shape of the jig and thereby imparting the shape to the article being formed. In some examples the spacer system is actuated by removal, retraction, or release of one or more physical spacers. In some examples, the spacers are removed gradually, at a controlled rate. In some examples, the spacers are removed gradually over a period of about 3 minutes.

At 1180-10 the formed article is cooled in the article-forming tool. In some examples a wing stringer formed in this manner may be cooled for about one hour before transport to wing assembly line. At 1180-11 the formed article is cured. Curing may be achieved by heating the article in air at temperatures greater than 180° C. The total processing time for a wing stringer formed according to the method of FIG. 11 may be about two hours.

No aspect of the foregoing drawings or description should be interpreted in a limiting sense, because numerous variations, additions, and omissions are also envisaged. For example, the spacer system in the illustrated article-forming tools comprises a releasable vise support with retractable spacers, which slide outward along rails arranged at the base of the tools. That embodiment is consistent with a strategy in which the downward force of gravity, acting on the vise and the article therein, causes the article to relax to the shape of the jig. It will be understood, however, that gravity is not the only force that can be used to make the article conform to the shape of the jig. For instance, the spacer system may instead comprise an air bladder arranged on the side of the vise opposite the jig. In this example the spacer system is actuated by inflation of the air bladder, which biases the vise against the jig. Application of mechanical forces besides gravity provides range of useful orientations of the formed article with respect to the article-forming tools. This disclosure fully embraces actuable spacer systems of all kinds arranged between rigid structural components of the article-forming tools.

It will be understood that the configurations and/or approaches described herein are exemplary in nature, and that these specific embodiments or examples are not to be considered in a limiting sense, because numerous variations are possible. The specific routines or processes described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An article-forming tool comprising:
an elongate jig having a predefined shape;
opposing the jig, an elongate flexible vise configured to hold a fiber-composite article of a predefined tee-shaped cross section, the article including a blade region and first and second flange regions extending in opposite directions from the blade region, the vise including:
a series of clamp segments arranged side-by-side along a length of the vise, each clamp segment comprising a set of platens configured to hold a corresponding longitudinal segment of the article with adjacent first and second platens and a third platen opposing both the first and second platens, and
a flexible spline sheet extending through the series of clamp segments, between opposing platens, and configured to conform controllably to the shape of the jig; and
a spacer system configured to control conformation of the spline to the shape of the jig,
wherein the vise holds the blade region between the first and second platens of each clamp segment, and holds the first and second flange regions between the third platen and the respective first and second platens of each clamp segment.

2. The tool of claim 1 wherein the spacer system includes at least one removable spacer arranged between the jig and the vise, configured to prevent the spline from conforming to the shape of the jig before removal.

3. The tool of claim 1 wherein the spacer system includes an air bladder configured to bias the vise against the jig.

4. The tool of claim 1 wherein the article is a stiffener member of an airframe of an aircraft.

5. The tool of claim 1 wherein the jig includes two or more parallel rails defining the shape.

6. The tool of claim 1 wherein each clamp segment includes, for each first and second platen, a fastener configured to tension that platen against the opposing third platen, thereby compressing the respective first and second flange regions, and wherein the fastener extends through the spline sheet.

7. The tool of claim 1 wherein the vise includes a bladder system configured to distribute pressure evenly on the first and second flange regions.

8. The tool of claim 7 wherein the bladder system includes elongate first and second air bladders extending through the series of clamp segments, wherein the first air bladder is arranged between the first platen of each clamp segment and the first flange region of the article, and wherein the second air bladder is arranged between the second platen of each clamp segment and the second flange region of the article.

9. The tool of claim 8 wherein the vise includes first and second caul plates arranged between the respective first and second air bladders and the respective first and second flange regions, and wherein each caul plate is configured to allow flexion along a first axis and to resist flexion along a second axis.

10. The tool of claim 1 wherein adjacent pairs of first platens, adjacent pairs of second platens, and adjacent pairs of third platens are separated along the length of the vise by respective first, second, and third spacings, and wherein each of the platens comprises a block with chamfered edges, to enable the series of clamp segments to follow the shape of the jig.

11. The tool of claim 1 further comprising a rolling base to allow the tool and an article held therein to be transported during processing.

12. A method for forming an elongate fiber-composite article, the method comprising:
    warming an elongate, laminated, fiber-composite charge to a sub-curing temperature that facilitates interlaminar sliding within the charge;
    processing the charge to form an intermediately formed article of a predefined tee-shaped cross section, wherein the intermediately formed article includes a blade region and first and second flange regions extending in opposite directions from the blade region;
    securing the intermediately formed article in a tool comprising:
        an elongate jig having a predefined shape,
        opposing the jig, an elongate flexible vise configured to hold the intermediately formed article, the vise including a series of clamp segments arranged side-by-side along a length of the vise, each clamp segment comprising a set of platens configured to hold a corresponding longitudinal segment of the intermediately formed article, and a flexible spline sheet extending through the series of clamp segments, between opposing platens of the set of platens including adjacent first and second platens and a third platen opposing both the first and second platens, and configured to conform controllably to the shape of the jig; and
        a spacer system configured to control conformation of the spline to the shape of the jig; and
    actuating the spacer system to cause the spline to conform to the shape of the jig, thereby imparting the shape to the article formed;
    wherein the vise holds the blade region between the first and second platens of each clamp segment, and holds the first and second flange regions between the third platen and the respective first and second platens of each clamp segment.

13. The method of claim 12 wherein the blade region has a fold, the method further comprising clamping the blade region in directions parallel to the first and second flange regions to prevent separation at the fold.

14. The method of claim 12 wherein the warming is discontinued before processing the charge.

15. The method of claim 12 further comprising moving the intermediately formed article to the tool after processing the charge.

16. The method of claim 12 wherein the spacer system is actuated gradually, at a controlled rate.

17. The method of claim 12 further comprising adding a fiber-composite radius filler to the blade region of the intermediately formed article prior to securing the article in the tool.

18. The method of claim 12 further comprising cooling the formed article in the tool prior to curing the formed article.

19. The method of claim 12 further comprising laminating a plurality of fiber-composite sheets to form the charge, wherein different numbers of fiber-composite sheets are stacked at different positions along the charge, causing a thickness ramp within the charge.

20. The method of claim 12 wherein the vise includes a bladder system, the method further comprising inflating the bladder system.

21. A tool for making a stringer for a wing of an aircraft, the tool comprising:
    an elongate jig having a predefined shape of an interior skin of the wing;
    opposing the jig, an elongate flexible vise configured to hold a fiber-composite charge bent into a predefined tee-shaped cross section, the charge including a blade region and first and second flange regions extending in opposite directions from the blade region, the vise including:
        a series of clamp segments arranged side-by-side along a length of the vise, each clamp segment comprising a set of platens configured to hold a corresponding longitudinal segment of the charge with adjacent first and second platens and a third platen opposing both the first and second platens, and
        a flexible spline sheet extending through the series of clamp segments, between opposing platens, and configured to conform controllably to the shape of the jig; and
    a spacer system configured to control conformation of the spline to the shape of the jig,
    wherein the vise holds the blade region between the first and second platens of each clamp segment, and holds the first and second flange regions between the third platen and the respective first and second platens of each clamp segment.

22. The tool of claim 21 wherein each clamp segment includes, for each first and second platen, a fastener configured to tension that platen against the opposing third platen, thereby compressing the respective first and second flange regions, and wherein the fastener extends through the spline sheet.

23. The tool of claim 21 wherein the vise includes a bladder system configured to distribute pressure evenly on the first and second flange regions.

* * * * *